United States Patent
Gregory (12)

(10) Patent No.: US 6,490,567 B1
(45) Date of Patent: *Dec. 3, 2002

(54) SYSTEM AND METHOD FOR DISTRIBUTED CONTENT ELECTRONIC COMMERCE

(75) Inventor: James McKanna Gregory, Sausalito, CA (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 140 days.

(21) Appl. No.: 08/783,181

(22) Filed: Jan. 15, 1997

(51) Int. Cl.[7] ............................................... G06F 17/60
(52) U.S. Cl. ............................. 705/39; 705/21; 705/26; 705/27
(58) Field of Search ......................... 395/226, 200.49; 364/408; 380/21, 23, 24; 705/39, 27, 26, 21

(56) References Cited

U.S. PATENT DOCUMENTS

| | | | |
|---|---|---|---|
| 4,677,552 A | | 6/1987 | Sibley, Jr. .................... 364/408 |
| 5,202,989 A | | 4/1993 | Hirosawa et al. ........... 395/650 |
| 5,305,200 A | | 4/1994 | Hartheimer et al. ........ 364/408 |
| 5,557,518 A | * | 9/1996 | Rosen ........................... 364/408 |
| 5,621,797 A | * | 4/1997 | Rosen ........................... 380/24 |
| 5,642,419 A | * | 6/1997 | Rosen ........................... 380/23 |
| 5,671,279 A | * | 9/1997 | Elgamal ....................... 380/23 |
| 5,703,949 A | * | 12/1997 | Rosen ........................... 380/21 |
| 5,710,887 A | * | 1/1998 | Chelliah et al. ............. 395/226 |
| 5,918,214 A | * | 6/1999 | Perkowski ................... 705/27 |

FOREIGN PATENT DOCUMENTS

| | | | | |
|---|---|---|---|---|
| CA | 2242874 | | 1/1996 | |
| WO | 96/04618 | * | 2/1996 | ........... G06F/17/60 |
| WO | 96/36948 | * | 11/1996 | ........... G06F/17/60 |

OTHER PUBLICATIONS

Burson–Marsteller, Sun Showcases Total Network Computing Solutions at Major Retail Trade Show, Business Wire, Jan. 19, 1996.*

Internet Commerce: VeriFone and DIGEX Alliance to Provide Turnkey Internet Commerce–Enabled Solution to Merchants; . . . , EDGE, on & about AT&T, Mar. 17, 1997.*

Nancy Etheredge, First Data Introduces Service to Provide Real–Time Bankcard Payment Information Over Internet, PR Newswire, Sep. 16, 1997.*

John Berry, TPN Register to Offer Data–Enriched Electronic Payment Service, PR Newswire, May 5, 1997.*

Derwent Information Limited 1995, *World Patent Index, EPI Manual Codes Part 1, Edition 4, Reprinted Nov. 1995.*

* cited by examiner

Primary Examiner—Vincent Millin
Assistant Examiner—Pedro Kanof (57) ABSTRACT

Distributed electronic commerce is conducted over a network by substantially separating transaction functionality from merchant content. Electronic commerce transaction functionality is provided by a commerce server having a commerce database. The commerce server stores merchant and purchaser profile data and merchant content summaries on the commerce database. The purchaser browses and searches for product and merchant information using the commerce server, and is provided with more detailed information stored at a separate merchant content server system. The purchaser selects products to purchase, and a purchase order is sent to the commerce server. The commerce server initiates the settlement of accounts between the merchant and purchaser, and initiates order fulfillment for the selected product. The separation of transaction functionality and merchant content onto separate servers under the control of a commerce service provider and a merchant, respectively, provides a more efficient and effective way of carrying out electronic commerce over a network.

59 Claims, 9 Drawing Sheets

HARRY'S OUTDOOR SUPPLY

- SKU: ⎯711
- CATEGORY: ⎯712
- MANUFACTURER: ⎯713
- PRODUCT NAME: ⎯714
- LIST PRICE: ⎯715
- OFFER PRICE: ⎯716
- WEIGHT: ⎯717
- SIZE RANGE: ⎯718
- GOOD UNTIL: ⎯719
- KEYWORD: ⎯720
- KEYWORD: ⎯721

- GO BACK ⎯722
- SUBMIT ⎯723
- URL: ⎯724
- TAG / VALUE ⎯725
- TAG / VALUE ⎯725

FIG. 8

EDIT A PRODUCT

- SKU: ⎯81
- MANUFACTURER: ⎯82
- CATEGORY: ⎯83
- PRODUCT NAME: ⎯84
- SUBMIT ⎯85
- GO BACK ⎯86

FIG. 9

```
                    SCANDIA ARIANNE HIKING BOOTS

SKU: 13245
                                              ┌─────────┐
   CATEGORY: FOOTWEAR                         │ DELETE  │
                                              └─────────┘
   MANUFACTURER: SCANDIA
                                              ┌─────────┐
   PRODUCT NAME: ARIANNE                      │ SUBMIT  │
                                              └─────────┘
   LIST PRICE: $162.00

OFFER PRICE: $148.00

WEIGHT: 3 LBS 4 OZ.

SIZE RANGE: 6-12

GOOD UNTIL: 09/98

KEYWORD: HIKING

KEYWORD: BACKPACKING

DATE ENTERED: 09-09-96: 1532
```

```
PITTSFORD HIKING BOOTS

131       SCANDIA'S ARIANNE BACKPACKING BOOT

REINFORCED                    THE ARIANNE HIKING BOOT
   EYELETS                       IS MADE TO LAST, AND
                                 WAAS MARKED THE BEST
                  EXTRA
                  HEEL
                  COMFORT                                  132

SUPPORTED  REALLY STRONG
    SOLE       LACES
                              SIZES: 6-12         133
                              WEIGHT: 3 LBS 4 OZ. 134
                              MSRP: $162.00       135
                              OUR SUPER LOW PRICE: $149.00  136
                              GOOD UNTIL: 09/98   137

MAKE        139           BUY THIS       138
       PURCHASES
```

US 6,490,567 B1

SYSTEM AND METHOD FOR DISTRIBUTED CONTENT ELECTRONIC COMMERCE

FIELD OF THE INVENTION

This invention relates to carrying out electronic commerce on a network, and particularly to an electronic commerce server and database that provide transaction functionality and content summaries to purchasers, and which refer purchasers to merchant content servers that provide more extensive information on products for sale on the network.

BACKGROUND OF THE INVENTION

Figure 1:
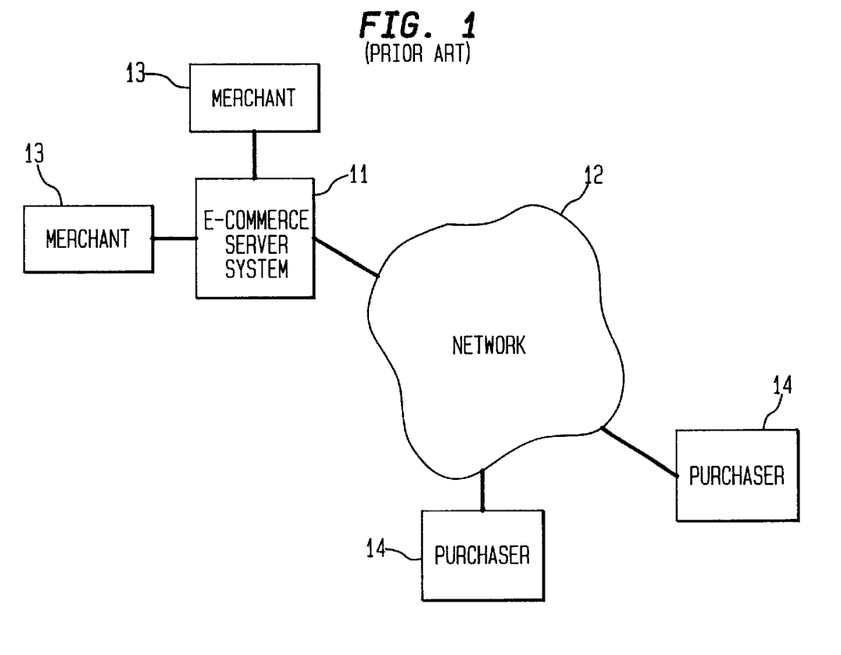
FIG. 1 shows a prior art embodiment of an electronic commerce system.

Electronic commerce is traditionally carried out over a network using a commerce server networked with purchasers and merchants. As shown in FIG. 1, such a traditional electronic commerce server system 11 provides substantially all of the functionality needed to carry out buying and selling on a network 12. This includes storing product information provided by merchants 13, accepting requests for information from prospective purchasers 14, and accepting and processing orders.

The number of commerce servers offered by different server vendors is limited. For example, each such server is configured and programmed differently. Thus, the traditional commerce server 11 is complex, expensive, and often requires substantial expertise to configure and operate. These disadvantages allow only the largest merchants to own and operate their own commerce servers.

Rather than operate their own commerce servers, smaller merchants typically purchase electronic commerce services provided by a commerce service provider. In this case, the provider owns and maintains the commerce server, who distributes configuration, operation and maintenance costs across the subscriber merchants, realizing an economy of scale. However, in so doing, the provider usually enforces uniform standards for appearance and methods of doing business to reduce the amount of custom programming necessary in order to economically accommodate several different merchants. Thus, each merchant being served loses a substantial amount of control over the way he conducts business over the network. This restricts the merchant's ability to express a particular personality and to do such things as develop distinctive trade dress. This places him at a competitive disadvantage in the marketplace, especially when compared to those merchants who can operate their own servers.

The service provider's expertise lies in the acquisition, operation, and maintenance of the commerce server hardware and the commerce functionality it provides to all of its merchants and purchasers. Examples of commerce functionality include taking orders and effectuating payment for any product offered by a merchant.

However, the service provider faces problems with respect to "content" from the merchant(s). First, content falls within the expertise of the merchant, not the provider. Second, the electronic commerce service provider faces high costs in acquiring, publishing, and maintaining a database of merchant content. This problem is especially pronounced when content from many merchants is stored in a large aggregate on a commerce server, because there is no economy of scale in adding merchant content to a server. The cost of adding an additional content file to a server is not less than the cost to add a similar file previously. In fact, the burden of loading, updating, and deleting content from each additional merchant can greatly increase the complexity and administrative cost of running a server beyond that for the content of the earlier-in-time merchants. Further, a larger aggregate of merchant content on a single commerce server slows the performance of the server.

Thus, under current methods of carrying out electronic commerce, the merchant whose expertise lies in producing and managing content is faced with the choice of operating and maintaining an expensive commerce server or losing control of his marketing to a provider. The provider, whose expertise lies in the acquisition and maintenance of electronic commerce hardware and software, must shoulder the burden of acquiring, publishing and maintaining merchant content.

SUMMARY OF THE INVENTION

A better way of conducting electronic commerce is to allocate most of the task of content acquisition and maintenance to the merchant, and allocate most of the task of providing electronic commerce transaction functionality to the service provider. Under this regime, neither the merchant nor the provider would be burdened with tasks outside their respective areas of expertise. The present invention provides a system for carrying out electronic commerce over a network where transaction functionality is provided by a commerce server having a commerce database, while detailed merchant content is provided on separate merchant content servers.

The commerce server maintains merchant profiles in the commerce database. The profiles comprise summaries of the products offered for sale by each merchant registered with the electronic commerce service. Here, the term "product" is meant to include services. A merchant profile also includes a merchant identification number, a list of the payment vehicles accepted by the merchant; a summary of merchant policies; and a summary background of the merchant. In one embodiment, the merchant identification number is the network address of the merchant's content server.

The commerce server also maintains purchaser profiles in the commerce database that comprise purchaser identification numbers, purchaser payment data (such as credit card and bank account numbers), and billing and shipping addresses.

The commerce server provides transaction functionality that effectuates an electronic commerce transaction. An electronic commerce transaction is the process of selling and purchasing an item over a network.

A purchaser requests the commerce server to send shopping information. The purchaser browses or searches for products on the commerce server, and data regarding products and merchants is retrieved from the commerce database. At the purchaser's request for more information on a product or merchant, the commerce server refers the purchaser to an appropriate merchant content server, which contains much more detailed information about the product and merchant than is available from the commerce database.

While browsing or searching the merchant content server, the purchaser may select one or more products for purchase. When the purchaser indicates he is ready to effectuate such a transaction, data concerning the selected product or products are sent to the commerce server. The data include information sufficient to identify the product, purchaser and selling merchant. The commerce server communicates with an external payment system to debit the purchaser's account and credit the merchant's account, effectuating the sale. The commerce server also generates a fulfillment message that ensures product delivery to the purchaser.

The commerce server also generates reports for the merchant and purchaser upon request. The reports summarize historical transaction data as requested.

Merchant content servers are simpler, easier to operate, and less expensive than the full-functioned servers traditionally used to maintain both content and transaction functionality in carrying out electronic commerce. The efficient division of functionality between the commerce server and the merchant content server thus advantageously streamlines the process of providing e-commerce services while lowering the cost thereof.

DETAILED DESCRIPTION

Figure 2:
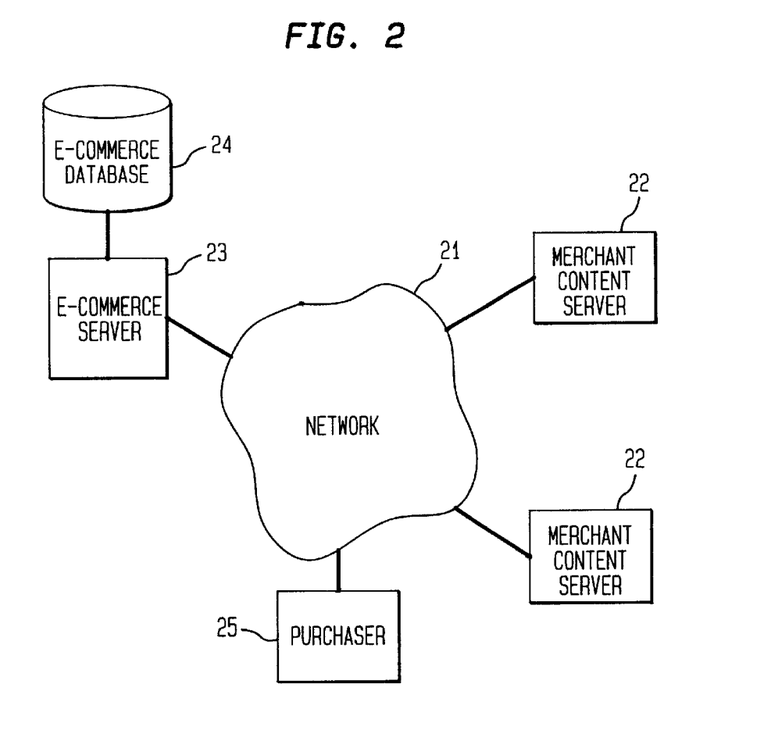
FIG. 2 shows an electronic commerce system in accordance with an embodiment of the present invention.

In accordance with the present invention, an embodiment of which is shown in FIG. 2, electronic commerce is carried out over a network 21 with a purchaser 25, where content is distributed through the network on merchant content servers 22, and transaction functionality is provided by an electronic commerce server 23 having an electronic commerce database 24. Network 21 is a data network, an example of which is the Internet.

The content servers 22 are controlled by merchants, and contain detailed merchant data. This merchant data comprises information on the products offered by the merchant, including product names, manufacturers, colors, sizes, and prices. It also includes multimedia information about the product, comprising at least one type of text, audio, graphic, animation and video data. Merchant data also comprises detailed information regarding warranty, guarantee, and merchandise return information, as well as background information regarding the merchant. Merchant content data includes information that comprises an electronic catalog of the merchant's products.

Figure 3:
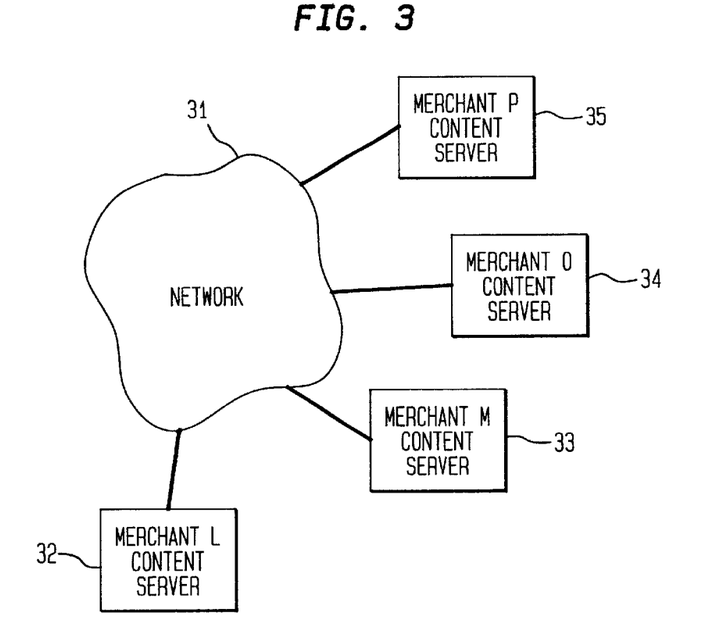
FIG. 3 shows merchant content servers connected to a network in accordance with an embodiment of the present invention.
Figure 4:
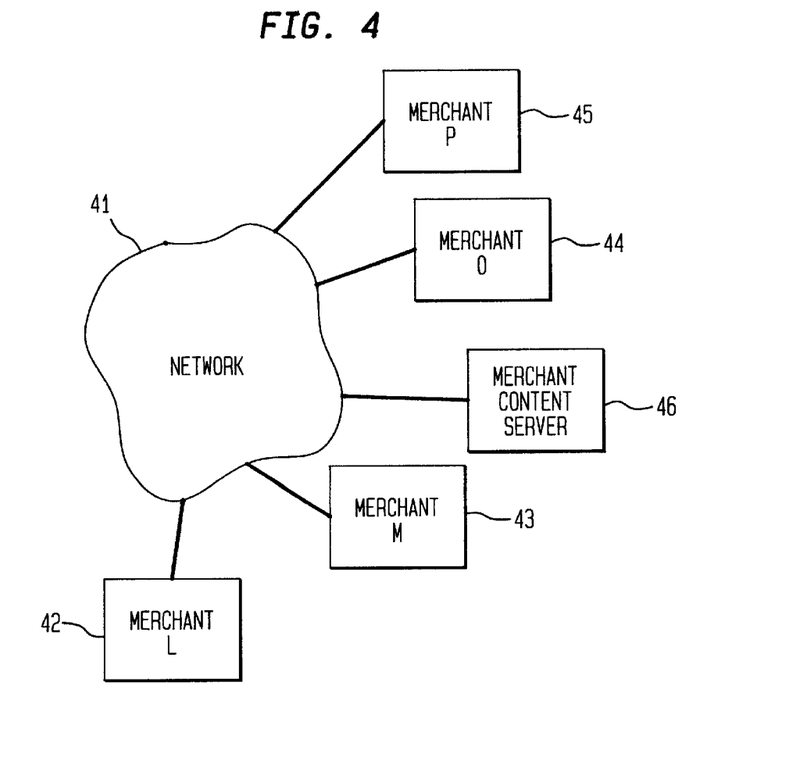
FIG. 4 shows merchant content servers connected to a network in accordance with another embodiment of the present invention.
Figure 5:
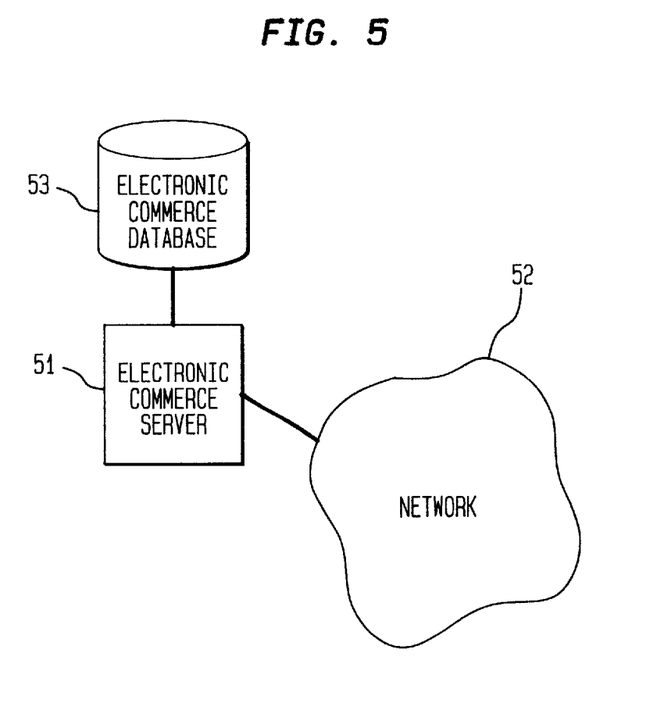
FIG. 5 shows an embodiment of an electronic commerce server and an electronic commerce database in accordance with an embodiment of the present invention.

Merchant content servers are simpler, easier to operate, and less expensive than the full-functioned servers traditionally used to maintain both content and transaction functionality in carrying out electronic commerce. In one embodiment of the present invention shown in FIG. 3, each merchant controls its own very simple content server 32, 33, 34 and 35, each of which is connected to the network 31. The term connected encompasses direct and indirect data connection. In other, words, when A is connected to B, A may be connected to B directly (e.g., via an RS 232 cable); through a network; or through a network of networks. In another embodiment shown in FIG. 4, several merchants 42, 43, 44 and 45 connected to a network 41 share a single content server 46 connected to the network. In this embodiment, the box representing merchant P 42 is a personal computer through which merchant P 42 is connected to the network 41. Merchant P 42 transfers data to and from the merchant content server 46 through the network 41, to which the merchant content server 46 is also connected. Merchants 42, 43 and 44 interact with the merchant content server 46 in the same way.

In accordance with the present invention, an electronic commerce server 23 controlled by a transaction service provider is also connected to the network 21, as shown in FIG. 2. The commerce server 23 provides transaction and content searching functionality and stores commerce server data including merchant abstract data on a commerce database 24.

Transaction functionality refers to the capability to carry out actions needed to effectuate a purchase and sale over the network 21. For example, in one embodiment, the transaction server accepts a credit card number from a purchaser and contacts the credit card vendor to verify that the account has a sufficient line of credit to complete the purchase of a product or products having a given price. Once authorization is received, the commerce server sends messages to a banking institution that debits the purchaser's account and credits that of the merchant, effectuating a purchase. Other transaction functionality can include: arranging to have the selected product shipped; and/or other order fulfillment functions, such as implementing a customer satisfaction survey along with product delivery, and storing the results for presentation and analysis.

Commerce server data comprises summary data on the products offered by those merchants that have content servers that subscribe to the electronic commerce service. In one embodiment, this includes product numbers, product categories, sizes, colors, prices, and a link to the appropriate merchant content server where more product information can be found. Commerce server data may also include merchant profile data, including summaries of the forms of payment accepted by a merchant, merchant policies, and merchant background information. Merchant profile data is added to the commerce database when the merchant initially registers for the service, and may be updated at any time by the merchant.

Commerce server data comprises abstracts of more extensive data available at the merchant content servers. These abstracts are generally substantially smaller in size than the data from which they are drawn on the merchant content server. For example, in one embodiment, a product abstract comprises a textual representation of a product name, product price, a one sentence description of the product, and the URL (Uniform Resource Locator, i.e., network address) of the merchant content server on which more information regarding the product may be found. The corresponding more fulsome information on the merchant content server includes the same information provided in the abstract, but further comprises a multimedia video of the product being modeled with accompanying audio, a full catalog description of the product, a description of all available sizes and colors, and shipping information. Thus, the abstract on the commerce server is a brief representation of content server data sufficient to enable the user to make an informed decision as to whether to seek additional information from the appropriate content server. This advantageously maximizes the benefits of distributed electronic commerce in accordance with the present invention.

Figure 6:
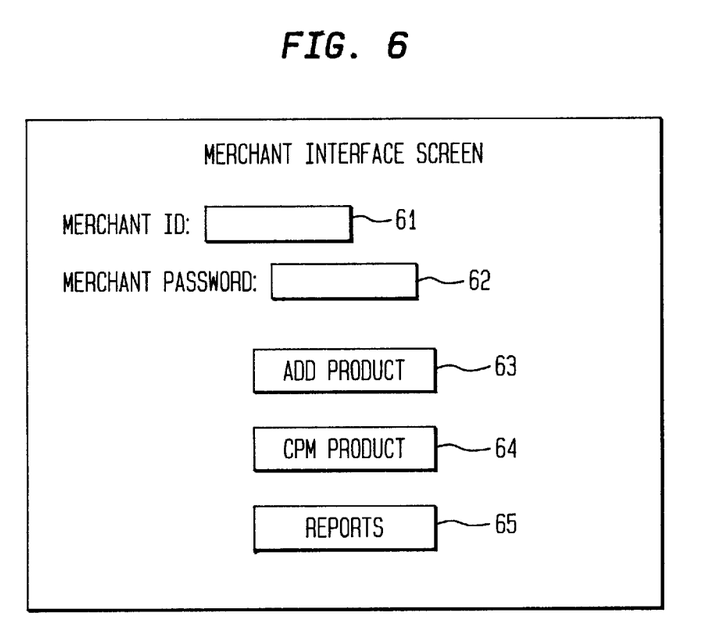
FIG. 6 shows an embodiment of a merchant interface screen in accordance with an embodiment of the present invention.

The present invention advantageously provides a simple and uniform interface to the merchant whereby the merchant adds merchant content summary data to the commerce database 24. An embodiment of such an interface is shown in FIG. 6.

In this embodiment a merchant is first identified 61 and authenticated 62 to the service, and then choose one of three possible functions adding product information 63; editing product information 64, or generating a report 65 based on historical transaction data.

Figure 7:
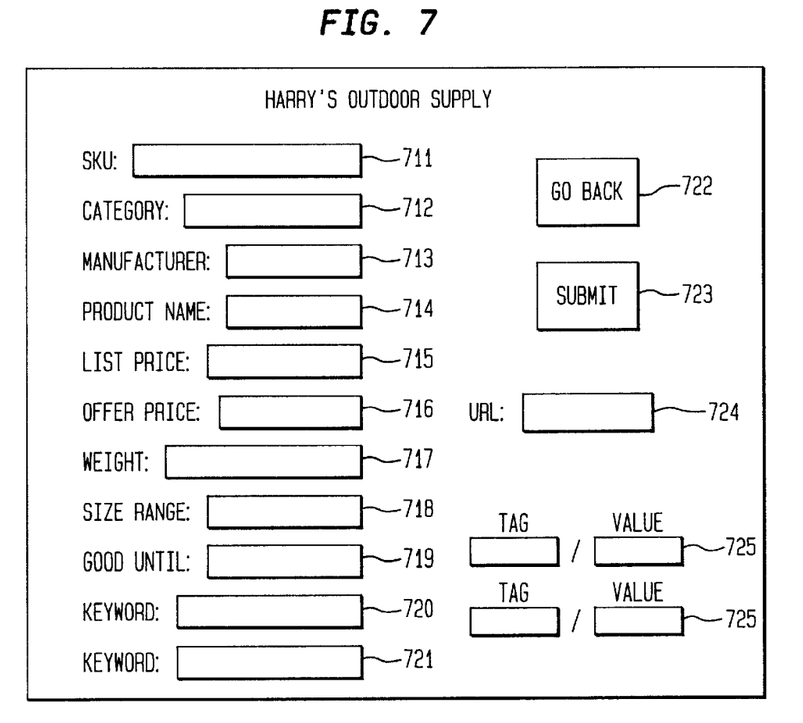
FIG. 7 shows an embodiment of a merchant content abstract update interface in accordance with the present invention.

If the merchant selects the add product button 63, the service presents to the merchant a screen for facilitating entry of product information. One such screen is shown in FIG. 7. In the illustrated embodiment the screen presents several product information fields, including a product identification number (SKU) field 711; category 712; manufacturer 713; product name 714; list price 715; offer price 716; weight 717; size range 718; a date until which the offer is good 719; and optional 10 keywords 720 and 721. A merchant may define his own attribute/value pairs 725 for a product, such as "Shell/Material" (e.g., "Shell/100% Cotton," or "Insulation/Material"(e.g., "Insulation/Wool.")

When the merchant is finished entering the new product data, he selects the submit button 723, and the commerce database is then updated, associating the newly submitted data with the merchant's identification number and a time stamp indicating when it was added. The collection of product information stored in the commerce database is called a merchant content abstract.

It should be noted that this input process and these interface screens are an illustrative embodiment of data entry methods of the present invention, and that any other interface or method for entering data that comport with the architecture of the present invention are valid. For example, in one embodiment, data entries are validated (e.g., checked for proper correspondence between manufacturer and product name, etc.) before the data entries update the electronic commerce server database.

In one embodiment of the present invention, the commerce server is provided with a merchant content abstract according to the following data structure:

```
merchant_content_abstract
    merchant            /*merchant identification number*/
    SKU_number          /*product identification number*?
    category            /*product type*/
    manufacturer        /*product maker*/
    keyword             /*searchable keyword*/
    keyword             /*searchable keyword*/
    name                /*product name*/
    list_price          /*manufacturer's suggested retail
                          price*/
    weight
    size_range
    offer_price         /*price offered to purchaser*/
    good_until          /*date offer expires*/
    time_stamp          /*time loaded by merchant*/
}
```

It should be noted that size/value and weight/value are two embodiments of a general attribute/value format. Each attribute/value pair may be specified by the merchant to tailor the abstract to meet his requirements. For example, for a saw, a merchant may specify the material of which the cutting surface is made with the attribute/value pair blade/material, e.g., blade/titanium.

Generally, the URL of the merchant content server is provided to the commerce server at the time the merchant registers with the service. However, in accordance with the present invention, the merchant may advantageously specify another URL 724 (FIG. 7)for a merchant content server on the abstract interface screen.

A further advantage of the present invention is that any server having content may register with the commerce server without having to be designed specifically to take advantage of the service. Besides registering with the service, it is only necessary that the merchant enter content abstracts to the commerce server.

Figure 8:
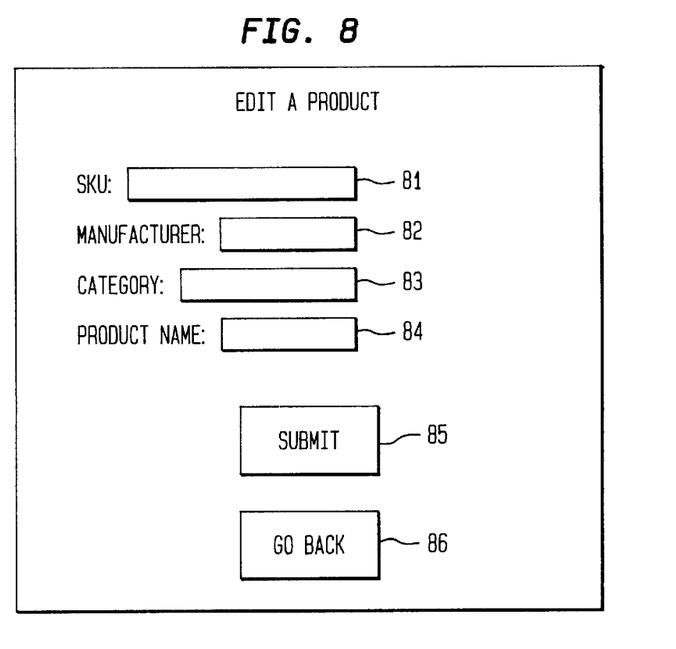
FIG. 8 shows an embodiment of a merchant content abstract edit interface in accordance with the present invention.
Figure 9:
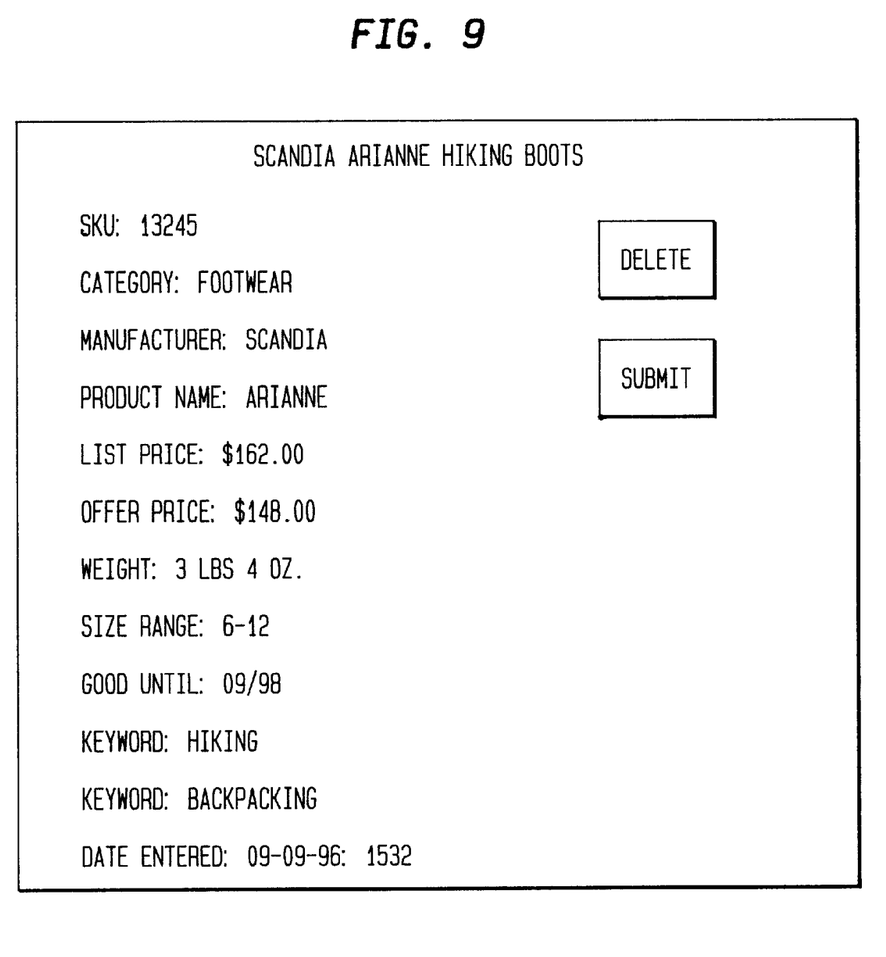
FIG. 9 shows another embodiment of a merchant content abstract edit interface in accordance with the present invention.

If the merchant selects the edit product button 64, he is presented in one embodiment with the screen shown in FIG. 8. The merchant may specify an exact product to edit by completely specifying its SKU 81, in which case the commerce database is searched and the corresponding product summary data are displayed, an example of which is shown in FIG. 9. Alternatively, he may include wildcard characters in the SKU and a list of matching products sold by that merchant will be displayed. For example, if * constitutes a wildcard symbol and the merchant specifies the SKU to be edited as 132*, the commerce server will search for all SKU's whose first three digits are 132. An SKU of 1??45 includes all SKU's whose first, fourth and fifth digits are 1, 4 and 5 respectively. Likewise, the merchant may request a listing by manufacturer, category or product name. In each of these cases, the e-commerce server searches for and presents a list of products. An example of such a list for all products manufactured by Scandia is shown in FIG. 10.

Figure 10:
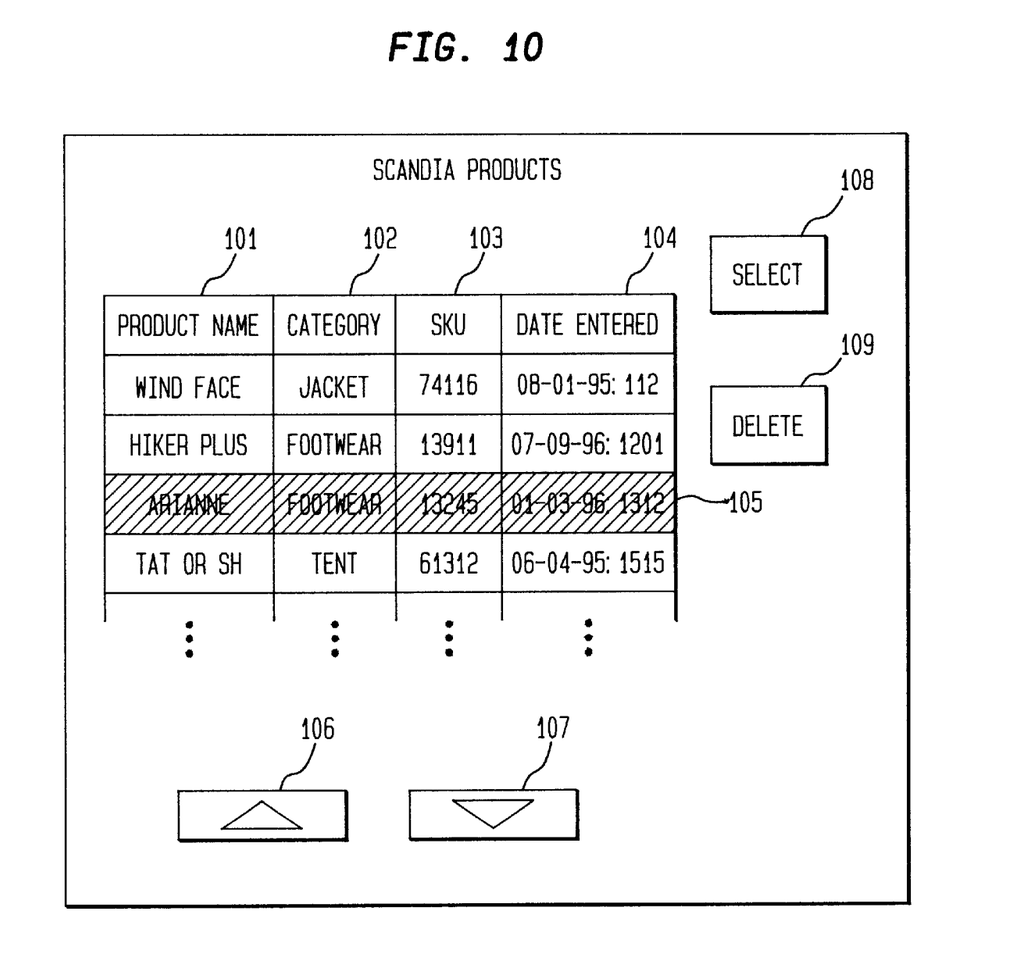
FIG. 10 shows an embodiment of a merchant content abstract edit interface that shows a list of products in the commerce database in accordance with the present invention.

As shown in FIG. 10, the list is a summary presentation of the product name 101, product category 102, SKU 103 and the date on which the product information was entered into the commerce database. A highlight bar 105 that covers one product at a time may be moved up and down the list by movement arrows 106 and 107, respectively. The merchant selects an item to edit from the list by moving the highlight bar over the item and then selecting the Select button 108. When the merchant selects an item from the list to edit, a screen such as that shown in FIG. 9 is presented to the merchant. Alternatively, the merchant may expediently delete product data for the highlighted product from the commerce database by selecting the delete button 109. Thus, the merchant may add, edit and delete his product data summaries in the commerce database according to a simple and uniform interface.

A pseudo code embodiment of the process for changing merchant product data summaries in the commerce database in accordance with the present invention is as follows:

```
change_merchant_content_abstract()
{
    identify_merchant () ;
    authenticate_merchant () ;
    case (add_product)
        accept product_data
        {
            merchant      /*merchant identification*/
            SKU_number    /*product identification
                            number*/
            category      /*product type*/
            manufacturer  /*product maker*/
            keyword       /*searchable keyword*/
            keyword       /*searchable keyword*/
            name          /*product name*/
            list_price    /*manufacturer's suggested
                            retail price*/
            weight
            size_range
            offer_price   /*price offered to
                            purchaser*/
            good_until    /*date offer expires*/
            time_stamp    /*time loaded by merchant*/
        }
    case(edit_product)
        case(identify_product_SKU) ;    / * identify
                                          product to be
                                          edited by
                                          completely
                                          specified SKU
                                          number*/
            display product_data
            if (delete_product)
                delete product_data
            else
                accept product edits
                store new product_data
            return
        case(identify_product_list) ;    / * identify
                                           product list by
                                           specifying SKU
                                           with wildcard or
                                           manufacturer or
                                           category*/
            display product_list
            accept product_selection     /*using highlight
                                           bar*/
            if(delete_product)
                delete_product_data
            else
                accept product edits
                store new product_data
            return
}
```

Figure 11:
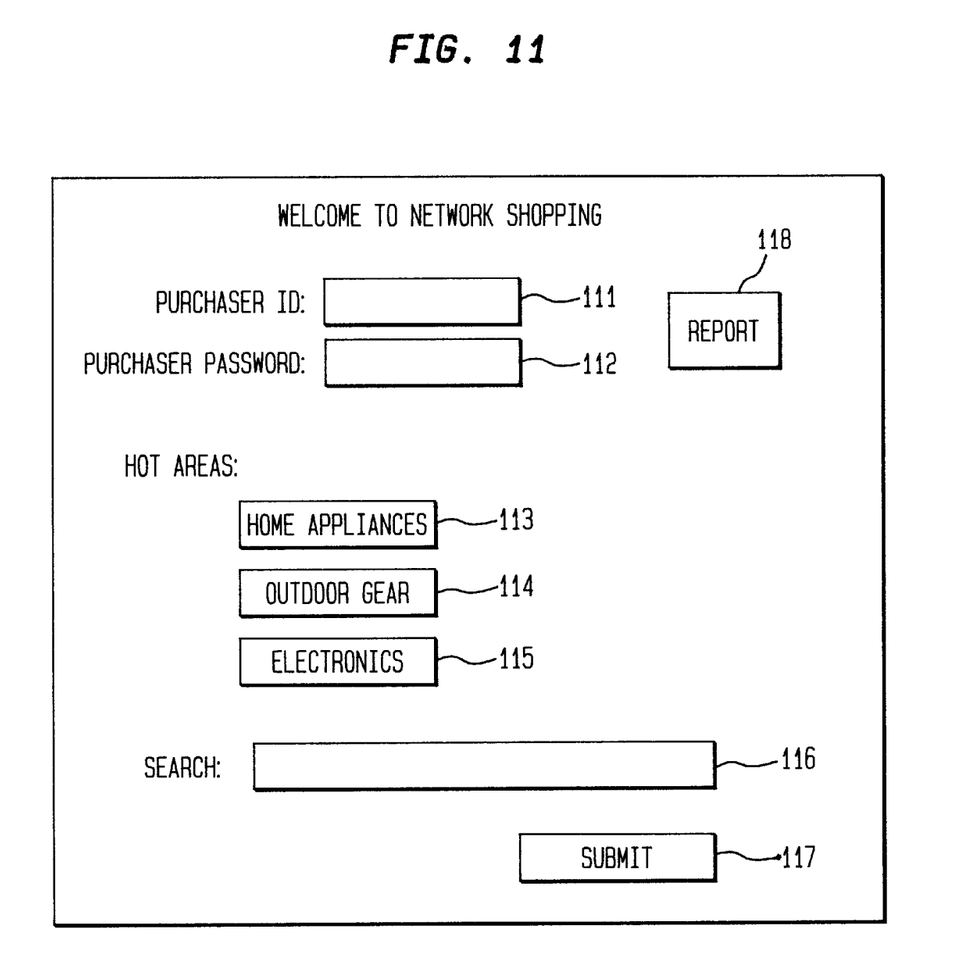
FIG. 11 shows an embodiment of a purchaser interface in accordance with the present invention.

The present invention thus advantageously provides a convenient and efficient way for a purchaser to shop over a network through simple and easy to understand interfaces. An embodiment of such an interface is shown in FIG. 11. When a purchaser connects to the commerce server and is identified by providing a purchaser ID in field 111 and is authenticated by providing a purchaser password in field 112, the commerce server associates any subsequent transactions with the purchaser's customer profile data stored on the commerce database. In one embodiment, customer profile data includes the customer's name, billing address, shipping address and credit card numbers with expiration dates. In another embodiment, customer profile data also includes information derived from historical transaction data, such as buying patterns. In yet another embodiment, customer profile data includes demographic data, including income level and household information of the purchaser.

A purchaser may choose to view product and merchant information by predetermined category, such as home appliances 113, outdoor gear 114, or electronics 115. Alternatively, the purchaser may wish to carry out a search of the commerce database. Such a search may be boolean, e.g., HIKING AND (BOOTS OR SHOES). In another embodiment, the search is in a natural language format as is known in the art, e.g., I NEED HIKING BOOTS FOR BACKPACKING.

Figure 12:
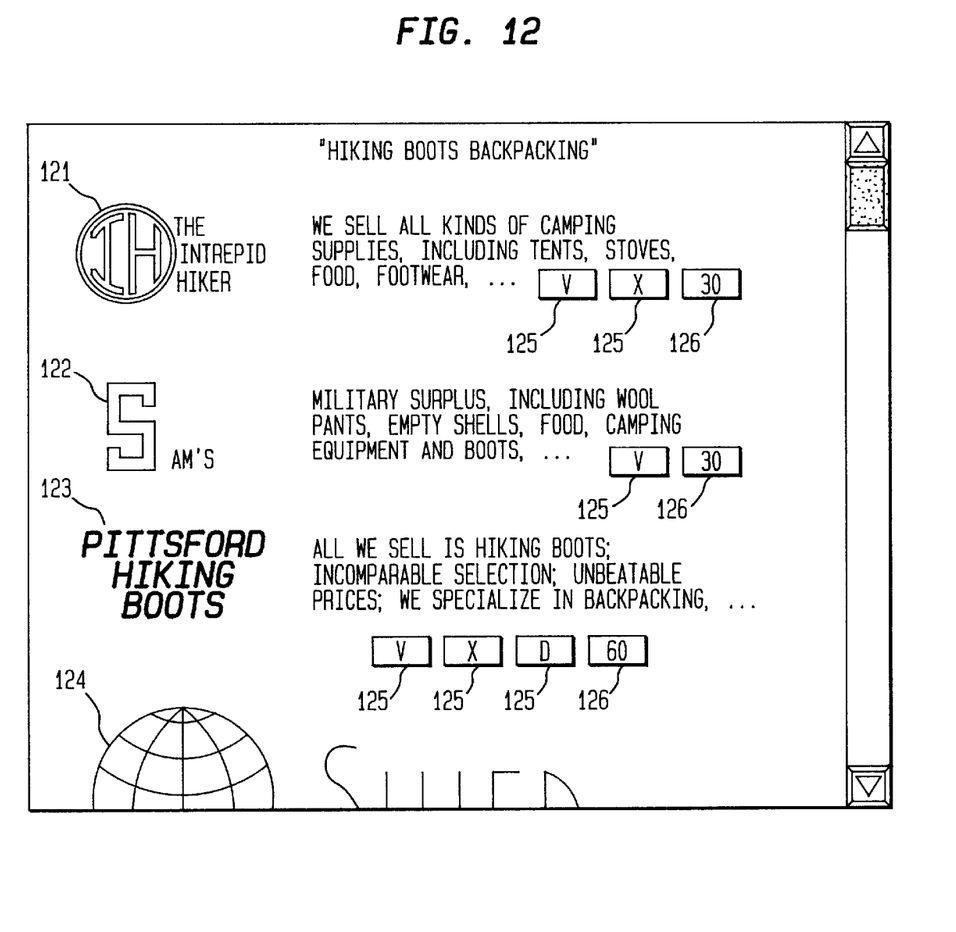
FIG. 12 shows an embodiment of a merchant information screen generated in response to a purchaser query in accordance with the present invention.

An embodiment of a screen responsive to such a natural language inquiry is shown in FIG. 12. Here, the response is shown according to the names of merchants 121, 122, 123 and 124 who sell hiking boots. In another embodiment, the response is shown in accordance with hiking boots products listed in the commerce database. In the embodiment shown in FIG. 12, tokens are displayed for each merchant indicating the types of payment accepted by the merchant 125 and the number of days in the merchant's money-back guarantee 126. This is merely meant to be exemplary of the types of information that could be supplied to the purchaser at this stage. Other types of information such as warranty information and service telephone numbers could also be included.

Upon selecting a merchant from the screen shown in FIG. 12, the purchaser is referred by the commerce server to the content server on which the selected merchant has placed his merchant content. In one embodiment in which the present invention is implemented on the Internet, the URL of the merchant is contained in a table in the commerce database that cross-references it to the merchant identifier in the product data structure. In another embodiment, the network address of the content server is included in the product data structure as an additional field.

Figure 13:
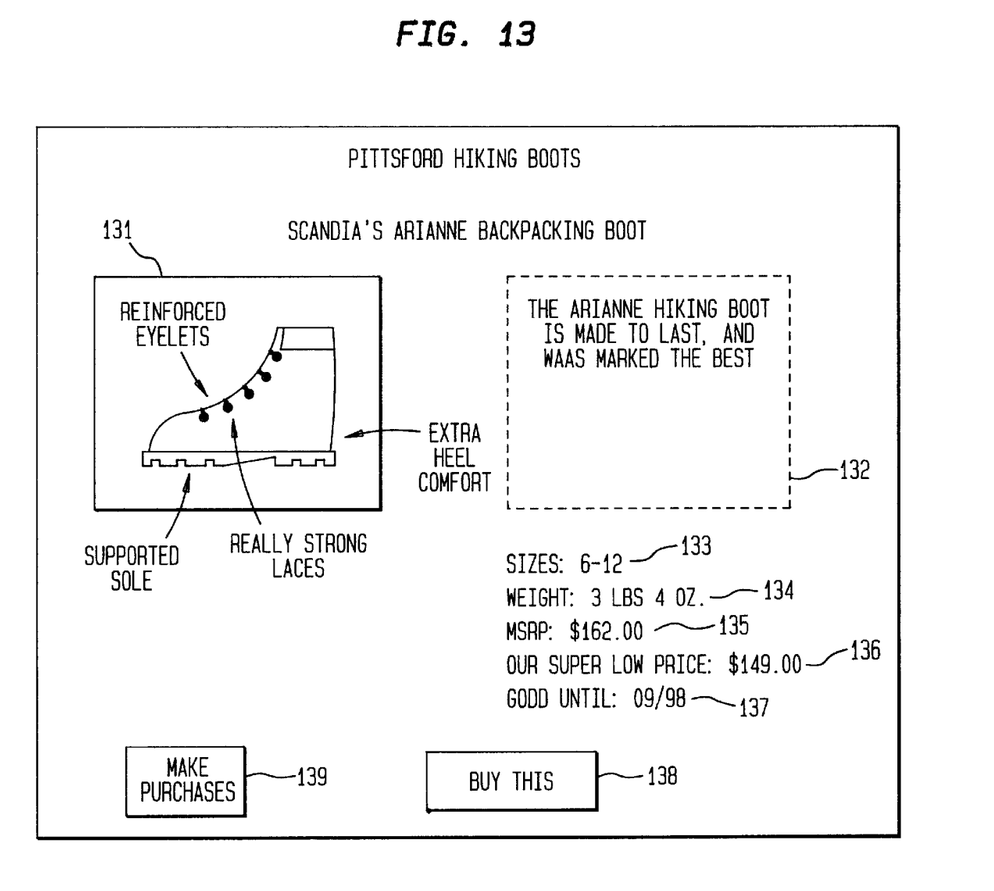
FIG. 13 shows an embodiment of a product information screen generated in response to a purchaser search on a merchant content server in accordance with the present invention.

Upon accessing the content server, the purchaser is presented with an electronic version of the merchant's store. Such stores are well known in the art as websites on the World Wide Web (WWW). The purchaser is able to search and browse among products offered by the merchant; learn detailed information regarding the merchant's return policy; learn about forms of payment accepted by the merchant; and order products. An example of a product screen at a content server is shown in FIG. 13. The picture of the boot 131 may be animated, and the boot could be slowly turned so all sides may be viewed. Audio accompanies the picture, describing the advantageous features of the boot. This is supplemented with textual information 132, as well as information about the boot's available sizes 133, weight 134, suggested retail price 135, offer price 136, and offer expiration date 137. If the purchaser wants to select the boot for purchase, the purchaser selects the Buy This button 138 at the bottom of the screen.

Every screen of this embodiment of the content server also can have a Make Purchases button 139. The purchaser selects this button when he is ready to effectuate an electronic transaction whereby the selected products are purchased.

When the purchaser has finished shopping and he selects the Make Purchases button 139, order information for his selected products is transmitted to the commerce server. In a preferred embodiment, this order information comprises the purchaser identification number, merchant identification number, SKU number, quantity, payment information, and special information (e.g., size, color) that may include attribute/value pairs. An embodiment of the data structure for such a purchase message from a content server to the commerce server is as follows:

```
purchase_order
{
    purchaser_id    /*purchaser identification number*/
    merchant_id     /*merchant identification number*/
    SKU             /*product identification number*/
    quantity        /*number of product ordered*/
    payment         /*credit or debit card selection*/
    special
        size
        color
    date_entered    /*When the order was sent*/
}
```

In this embodiment, the price of the selected product is derived from its merchant content abstract in the commerce database. In another embodiment, the price of the selected item is included in the purchase order from the merchant content server, and need not be derived from the commerce database.

Upon receiving the purchaser order message, the commerce server effectuates the transaction first by retrieving the appropriate data from the commerce database. In one embodiment, this data includes customer profile data including purchaser credit card numbers, billing and shipping addresses. It further includes merchant profile data including merchant account numbers and acceptable forms of payment data. It further includes product data information such as price information. In another embodiment, this information further includes product availability data, which is used in conjunction with an inventory control program of a kind well known in the art to obtain and ship a product in the most expedient and efficient manner possible from a plurality of available sources. For example, in one embodiment of the present invention, the commerce server database maintains information on the inventory levels for each merchant for each of his products. If a purchaser submits an order for a product of which a merchant is out of stock, the merchant may backorder the item or the purchaser may select another merchant.

The commerce server interacts with external payment systems (e.g., a bank) to cause purchaser's payment vehicle (such as a credit or debit card account) to be debited, and the merchant's account to be credited. In one embodiment, the merchant's bank account is directly credited with the appropriate amount. In another embodiment, the merchant's account with the commerce service is credited, and actual payment to the merchant's bank account is made at a later date in accordance with a predetermined commerce service policy.

A pseudo-code embodiment of the purchasing process in accordance with the present invention is as follows:

```
purchase_process () ;
{
    accept request          /commerce server accepts
                            request for shopping page
                            from purchaser*/
    display shopping_page   /*shopping page is
                            displayed to purchaser*/
    accept purchaser_query  /*accept purchaser natural
                            language query*/
    search commerce_database /*commerce database is
                            searched for products and
                            merchants that match
                            purchaser_query*/
    if(no match)
        display no_match
    else
```

-continued

```
    display matching_merchants
    {
        merchant_name           /*merchant name is
                                selectable with
                                underlying network
                                address pointing to
                                merchant content
                                server*/
        merchant_network_address
        payment_accepted        /*tokens indicating
                                credit and/or debit
                                cards accepted*/
        return_policy           /*token indicating
                                days to return for
                                refund*/
        merchant_blurb          /*brief textual blurb
                                about merchant*/
    }
    return
    accept merchant_selection   /*merchant selected by
                                purchaser*/
    refer purchaser to
    merchant content server     /*at network address
                                for content server for
                                selected merchant*/
    accept purchase_order from purchaser
    {
        purchaser_id    /*purchaser identification
                        number*/
        merchant_id     /*merchant identification
                        number*/
        SKU             /*product identification
                        number*/
        quantity        /*number of product
                        ordered*/
        payment         /*credit or debit card
                        selection*/
        special_selection_data
            size
            color
        date_entered    /*When the order was sent*/
    }
    search database for purchaser_profile
    {
        purchaser_id
        payment_data_1
            credit_card type
            credit_card_number
            expiration_date
        payment_data_2
            credit_card_type
            credit_card_number
            expiration_date
        billing_address
        shipping_address
        date_entered    /*this filed is used
                        as a flag in updating
                        or eliminating old
                        information*/
    }
    search database for merchant_profile
    {
        merchant_id
        merchant_account_number
    }
    effectuate payment          /*payment type selected by
                                purchaser is debited*/
    initiate order fulfillment  /*an electronic
                                message is formatted
                                and sent to the
                                appropriate order
                                fulfillment agent,
                                instructing the agent
                                which products to ship
                                to the purchaser*/
}
```

The present invention also advantageously provides the purchaser and merchant with the ability to generate various reports based upon historical transaction data stored on the commerce database. A merchant generates a report by selecting the report button 65 on the screen shown in FIG. 6. In one embodiment, a merchant report lists all sales of merchant's products through the service on a monthly, weekly or daily basis selectable by the merchan*t. In another embodiment, a report shows summary dollar amounts generated by sales by categories specified by the merchant. In yet another embodiment, a report presents the results of customer satisfaction surveys in formats readily and advantageously selectable by the merchant (e.g., by product purchased, time period, or by selected demographic features of the purchaser).

A purchaser generates a report by selecting the report button 118 shown in FIG. 11. In one embodiment, a report shows all purchases made by the purchaser through the service over the past five, ten or thirty days, or since the beginning of the present calendar year. In another embodiment, a report shows a breakdown of dollar amounts purchased under each form of payment authorized by the purchaser since the beginning of the present calendar year.

The reporting feature of the present invention advantageously provides both merchants and purchasers with the ability to track and assess the utility and efficiency of the service. It also assists the merchant and purchaser to control budgets and track cash flow.

Separating merchant content from transaction functionality on an electronic commerce system in accordance with the present invention represents a sensible and efficient allocation of resources in promoting commerce over a network. It allows the transaction service provider to concentrate his resources on providing the most up-to-date and efficient set of services for effectuating buying and selling transactions between networked parties. Likewise, the merchant is freed form the burden of maintaining transaction functionality, and concentrates on his area of expertise, merchant content and product information. The present invention thus provides a more effective and efficient way of carrying out electronic commerce.

What is claimed is:

1. An apparatus for performing an electronic commerce transaction over a network to which a purchaser is coupled, comprising:
    at least one merchant content server that is coupled to the network and that stores content information about products for sale by one or more merchants; and
    a common electronic commerce server that is coupled to the network and that provides commerce server data for the products to the purchaser, receives a request from the purchaser for information about a desired product, determines the location of the merchant content server that stores information about the desired product, refers the purchaser to the merchant content server at the determined location, receives order information from the merchant content server for products selected by the purchaser and processes the order information to complete the electronic commerce transaction for products offered for sale by the one or more merchants.

2. The apparatus of claim 1, wherein the at least one merchant content server is controlled by the one or more merchants.

3. The apparatus of claim 1, wherein the common commerce server is controlled by a transaction service provider.

4. The apparatus of claim 1, wherein the commerce server data comprises summary data related to the one or more products for sale by the one or more merchants.

5. The apparatus of claim 1, wherein the commerce server data comprises abstracts of the content information about the one or more products stored in the at least one merchant content server.

6. The apparatus of claim 1, wherein the common electronic commerce server provides transaction functionality for a plurality of merchant content servers.

7. The apparatus of claim 1, wherein the common electronic commerce server is separate from the at least one merchant content server.

8. A system for use in an electronic commerce transaction conducted over a network, the system comprising:
    a common electronic commerce server coupled to the network, the electronic commerce server for providing electronic commerce transaction functionality for a plurality of merchants subscribing to the system, the transactional functionality including completing the transaction; and
    at least one merchant content server coupled to the network, the merchant content server for storing detailed merchant content related to at least one product for sale by the subscribing merchants, wherein the detailed merchant content is separate from the transaction functionality provided by the electronic commerce server.

9. The system as recited in claim 8, further comprising:
    an electronic commerce database residing in the electronic commerce server, wherein the electronic commerce database comprises a merchant content abstract for each product for sale by the subscribing merchants, and an address for the at least one merchant content server, and wherein responsive to a request made by a purchaser desiring detailed merchant content related to the at least one product for sale by the subscribing merchants, the electronic commerce server refers the purchaser to the at least one merchant content server based on the address.

10. The system of claim 9, wherein the at least one merchant content server for further presenting detailed merchant content to the purchaser based on the purchaser request and upon an indication to purchase a selected product, forwarding transactional information related to the selected product to the electronic commerce server to provide the electronic commerce transaction functionality to complete the electronic commerce transaction.

11. The system of claim 9, wherein the merchant content abstract comprises a summary of associated merchant content related to the at least one product stored on the merchant content server.

12. The system of claim 9, wherein the merchant content abstract comprises:
    merchant identification data;
    product identification data; and
    product price data.

13. The system of claim 9, wherein the merchant content abstract comprises an attribute/value pair.

14. The system of claim 9, wherein the merchant content abstract comprises:
    a time stamp indicating the time said merchant content abstract was stored on said database; and
    a product keyword.

15. The system of claim 13, wherein the merchant content abstract further comprises product weight data useful in determining the cost of shipping a selected product.

16. The system of claim 9, wherein the electronic commerce database further comprises merchant profile data.

17. The system of claim 9, wherein the electronic commerce database further comprises purchaser profile data.

18. The system of claim 9, wherein the electronic commerce database further comprises historical transaction data.

19. A method for conducting an electronic commerce transaction between parties including one or more merchants offering products for sale and a purchaser using a network, the method comprising the steps of:

provpiding content functionality by content servers coupled to the network, wherein content functionality provides detailed merchant content information about products being offered for sale by the one or more merchants to the purchaser; and providing transaction functionality by a commerce server coupled to the network, wherein includes completing the transaction is provided separate from the content functionality.

20. The method of claim 19, wherein the step of providing content functionality comprising the step of:

storing detailed merchant content information related to the products being offered for sale comprising one or more of product names, product manufacturers, product colors, product sizes, product prices and multimedia product information.

21. The method of claim 19, wherein the step of providing content functionality further comprising the step of:

presenting the detailed merchant content information about a product to the purchaser upon request.

22. The method of claim 21, wherein the step of providing transaction functionality comprising the steps of:

storing a merchant content abstract in a commerce database;

presenting the products being offered for sale by the one or more merchants to the purchaser;

receiving a request for detailed content information from the purchaser for a desired product;

searching the commerce database for content servers containing the detailed content information for the desired product;

presenting the results of said search to the purchaser;

providing at least one location reference for a content server containing the detailed content information for the desired product for selection by the purchaser; and forwarding the purchaser to the selected content server.

23. The method of claim 22, further comprising the step of:

presenting by the selected content server the detailed content information for the desired product.

24. The method of claim 22, further comprising the steps of:

receiving a purchase request from the purchaser for the desired product; and initiating an electronic transaction process by the commerce server to complete the electronic commerce transaction for the desired product.

25. The method of claim 22, wherein the merchant content abstract is received from the one or more merchants.

26. The method of claim 22, wherein the merchant content abstract is generated automatically by the commerce server using results of an electronic search of the content servers.

27. The method of claim 22, wherein the step of storing the merchant content abstract comprising the steps of:

storing product identification data;

storing merchant identification data; and storing product price data.

28. The method of claim 27, wherein the step of storing the merchant content abstract further comprises the step of:

storing a time stamp designating the time at which said merchant content abstract is stored in the commerce database.

29. The method of claim 24, wherein the step of initiating the electronic transaction process comprising the steps of:

receiving payment vehicle selection data;

directing that the selected payment vehicle be debited to the sum of the net cost of the selected product;

directing that a merchant account be credited for the sale of the desired product; and directing the delivery of the desired product to its purchaser.

30. The method of claim 29, further comprising the step of:

storing a record of the electronic transaction in the commerce database.

31. The method of claim 29, wherein the step of receiving payment vehicle selection data comprises the step of:

retrieving a preregistered payment vehicle information from a preregistration database.

32. The method of claim 29, wherein the step of receiving payment vehicle selection data comprises the steps of:

accessing a purchaser profile;

retrieving purchaser credit card identification data;

retrieving a purchaser credit card number; and retrieving a purchaser credit card expiration date.

33. The method of claim 29, further comprising the step of:

storing transaction data in the commerce database.

34. The method of claim 20, further comprising the step of:

generating a transaction report.

35. The method of claim 34, wherein the transaction report is generated for the one or more merchants.

36. The method of claim 35, wherein the transaction report is generated for the purchaser.

37. The method of claim 36, wherein the at least one location reference comprises a Uniform Resource Locator for the content server containing the detailed content information for the desired product.

38. A computer-readable medium having computer-executable instructions for performing the steps of:

providing content functionality by content servers coupled to a network, wherein content functionality provides detailed merchant content information about products being offered for sale by one or more merchants to a purchaser; and providing transaction functionality by a commerce server coupled to the network [for completing the electronic commerce transaction], wherein the transactional functionality which includes completing the transaction is provided separate from the content functionality.

39. The computer-readable medium of claim 38, having further computer-executable instructions for performing the step of:

storing detailed merchant content information related to the products being offered for sale comprising one or more of product names, product manufacturers, product colors, product sizes, product prices and multimedia product information.

40. The computer-readable medium of claim 39 having further computer-executable instructions for performing the step of:

presenting the detailed merchant content information about a product to the purchaser upon request.

41. The computer-readable medium of claim 39, wherein the computer-executable instructions for providing transaction functionality having further computer-executable instructions for performing the steps of:

storing a merchant content abstract in a commerce database;

presenting the products being offered for sale by the one or more merchants to the purchaser;

receiving a request for detailed content information from the purchaser for a desired product;

searching the commerce database for content servers containing the detailed content information for the desired product;

presenting the results of said search to the purchaser;

providing at least one location reference for a content server containing the detailed content information for the desired product for selection by the purchaser; and forwarding the purchaser to the selected content server.

42. The computer-readable medium of claim 41 having further computer-executable instructions for performing the step of:

presenting by the selected content server the detailed content information for the desired product.

43. The computer-readable medium of claim 41 having further computer-executable instructions for performing the steps of:

receiving a purchase request from the purchaser for the desired product; and initiating an electronic transaction process by the commerce server to complete the electronic commerce transaction for the desired product.

44. The computer-readable medium of claim 43, wherein the computer executable instructions for storing the merchant content abstract having further computer-executable instructions for performing the steps of:

storing product identification data;

storing merchant identification data; and storing product price data.

45. The computer-readable medium of claim 43, wherein the computer executable instructions for initiating the electronic transaction process having further computer-executable instructions for performing the steps:

receiving payment vehicle selection data;

directing that the selected payment vehicle be debited to the sum of the net cost of the selected product;

directing that a merchant account be credited for the sale of the desired product; and directing the delivery of the desired product to its purchaser.

46. An electronic commerce server system for carrying out electronic commerce between purchasers and merchants over a network comprising:

at least one merchant content servers coupled to the network, wherein content server provides detailed merchant content information about products being offered for sale by the merchants to the purchasers; and a common commerce server coupled to the network to provide transactional functionality, wherein the transactional functionality which includes completing the electronic commerce transaction is provided separate from the content functionality.

47. The electronic commerce server system of claim 46, further comprising:

a computer readable storage media for storing a merchant content abstract;

means for receiving a request for merchant content information;

a computer for searching said computer readable storage media for merchant content information responsive to said request;

means for presenting the results of said search;

means for providing a reference to the at least one merchant content server connected to the network;

means for receiving a purchase request having a selected product; and means for initiating an electronic transaction for said selected product.

48. The system of claim 47, further comprising:

means for generating a transaction report.

49. A method for conducting an electronic commerce transaction, the method comprising:

receiving a request for detailed information about a product from a purchaser at a electronic commerce server;

transferring the purchaser to a merchant content server that contains the requested detailed information about the product;

receiving a purchaser order message at the commerce server from the merchant content server after the purchaser elects to effectuate a transaction; and providing transactional functionality at the commerce server to complete the transaction.

50. The method of claim 49, further comprising:

processing information related to the purchaser order message to complete the transaction at the commerce server.

51. The method of claim 49, further comprising:

storing detailed information related to products being offered for sale, the detailed information comprising one or more of product names, product manufacturers, product colors, product sizes, product prices and multimedia product information.

52. The method of claim 49, further comprising:

providing an abstract of based on the detailed information about the product to the purchaser.

53. A machine-readable medium having stored thereon a plurality of executable instructions, the plurality of instructions comprising instructions to:

receive a request for detailed information about a product from a purchaser at a electronic commerce server;

transfer the purchaser to a merchant content server that contains the requested detailed information about the product;

receive a purchaser order message at the commerce server from the merchant content server after the purchaser elects to effectuate a transaction; and provide transactional functionality at the commerce server to complete the transaction.

54. A machine-readable medium of claim 53, having stored thereon further instructions comprising instructions to:

process information related to the purchaser order message to complete the transaction at the commerce server.

55. A machine-readable medium of claim 53, having stored thereon further instructions comprising instructions to:

store detailed information related to products being offered for sale, the detailed information comprising one or more of product names, product manufacturers, product colors, product sizes, product prices and multimedia product information.

56. A machine-readable medium of claim 53, having stored thereon further instructions comprising instructions to:

provide an abstract of based on the detailed information about the product to the purchased.

57. An electronic commerce server for carrying out electronic commerce between purchasers and merchants over a network, the electronic commerce server to:

receive a request for detailed information about a product from a purchaser;

transfer the purchaser to a merchant content server that contains the requested detailed information about the product;

receive a purchaser order message from the merchant content server after the purchaser elects to effectuate a transaction; and process information based on the purchaser order message to complete the transaction.

58. The electronic commerce server of claim 57, the electronic commerce server to further:

present summary data related to one or more products for sale by one or more merchants.

59. The apparatus of claim 58, wherein the summary data includes abstracts of the content information about the one or more products.

* * * * *

UNITED STATES PATENT AND TRADEMARK OFFICE
CERTIFICATE OF CORRECTION

PATENT NO.   : 6,490,567 B1
DATED        : December 3, 2002
INVENTOR(S)  : James McKanna Gregory It is certified that error appears in the above-identified patent and that said Letters Patent is hereby corrected as shown below:

Column 13,
Line 11, after "wherein and before "includes", insert -- the transactional functionality which --.
Line 14, "comprising" is changed to -- comprises --.
Line 22, "comprising" is changed to -- comprises --.
Line 24, "comprising" is changed to -- comprises --.
Line 59, "comprising" is changed to -- comprises --.

Column 14,
Line 2, "comprising" is changed to -- comprises --.
Lines 48-50, the words in brackets "[for completing the electronic commerce transaction]" are deleted.

Column 16,
Line 40, delete "of".

Column 17,
Line 7, delete "of".

Column 65,
Line 22, "connected a first" is changed to -- connected to a first --.

Signed and Sealed this

Twenty-ninth Day of April, 2003

JAMES E. ROGAN
*Director of the United States Patent and Trademark Office*